T. LEBLANC.
HUB CAP.
APPLICATION FILED NOV. 11, 1919.
1,378,691.
Patented May 17, 1921.
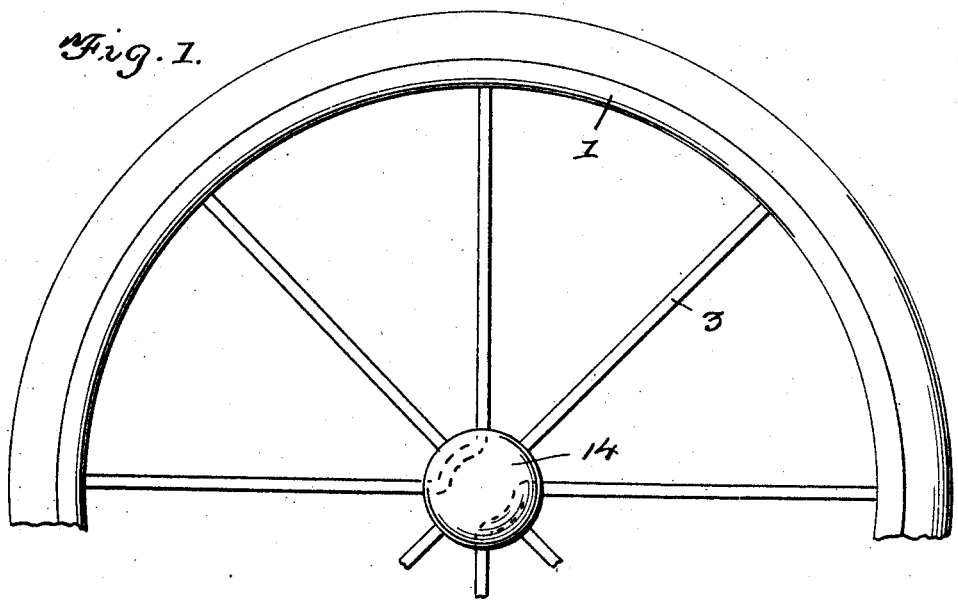
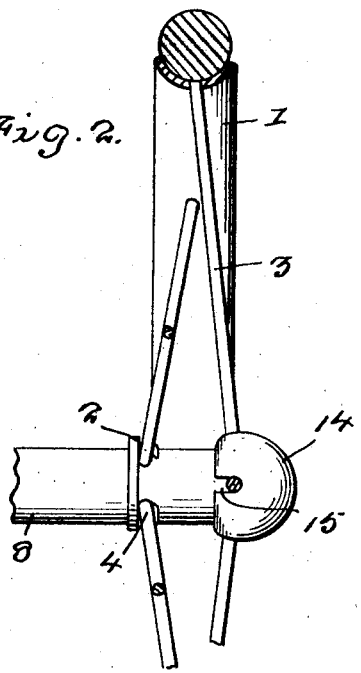
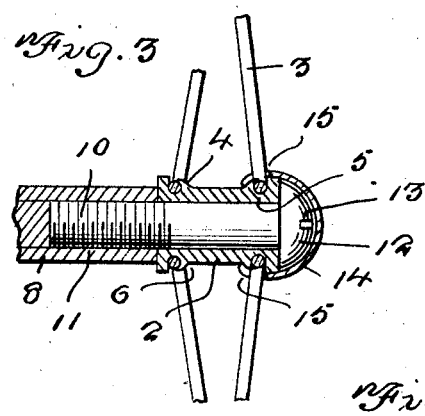
Inventor
T. Leblanc
Witnesses
E. R. Ruppert
By Victor J. Evans
Attorney

UNITED STATES PATENT OFFICE.

THOMAS LEBLANC, OF WEST GARDNER, MASSACHUSETTS.

HUB-CAP.

1,378,691.	Specification of Letters Patent.	Patented May 17, 1921.

Application filed November 11, 1919. Serial No. 337,373.

*To all whom it may concern:*

Be it known that I, THOMAS LEBLANC, a citizen of the United States, residing at West Gardner, in the county of Worcester and State of Massachusetts, have invented new and useful Improvements in Hub-Caps, of which the following is a specification.

The object of my present invention is the provision of a wheel constructed in such manner that the wheel is rendered strong and durable, and at the same time is adapted to be secured in a peculiar and advantageous manner in working position on an axle.

To the attainment of the foregoing, the invention consists in the improvement as hereinafter described and definitely claimed.

In the accompanying drawings, hereby made a part hereof:

Figure 1 is an elevation of the outer side of the wheel construction constituting the best practical embodiment of my invention of which I am cognizant.

Fig. 2 is a view taken at right angles to Fig. 1, and showing the wheel partly in section and also showing the wheel hub, the axle, and the cap in elevation.

Fig. 3 is a longitudinal, diametrical section illustrative of the relative arrangement of the axle, the headed spindle, the wheel hub and the cap.

Fig. 4 is a view showing the cap *per se* precedent to the securing of the same on the spokes of the wheel.

Similar numerals of reference designate corresponding parts in all of the views of the drawings.

The wheel is of metallic construction, and includes a rim 1, a tubular hub 2, and spokes 3; the said spokes being formed in pairs, and with their outer ends fixed to the rim 1, while the inner ends of each pair of spokes are joined by a bight 4 that is seated in a circumferential groove 5 in the outer surface of the hub, and is secured in said groove by upsetting the walls 6 thereof against the bight, and also by welding. It will also be observed that the bights of the spoke pairs are arranged at the inner sides of end circumferential flanges 7 on the hub, with the result that the spokes are strongly connected to the hub, and at the same time are braced by the flanges against outward deflection. Manifestly this construction while extremely simple and inexpensive, conduces to the provision of an exceedingly strong and durable metallic wheel.

The outer end portion at least of the axle 8 is tubular and interiorly threaded, as indicated by 9, to receive the threaded portion 10 of a bolt 11 on the outer end of which is a head 12, provided with a kerf 13. The bolt 11 is adapted to serve as a spindle for the wheel, and it will be readily noted that the wheel may be strongly connected with the axle by simply passing the bolt spindle through the hub 2, and turning the bolt spindle into threaded engagement with the tubular end portion of the axle; the head of the bolt spindle being of course disposed at the outer end of the hub 2, and so that the hub is free to turn about the bolt spindle.

After the wheel is connected to the axle in the manner described, the cap 14 is put into place. The said cap 14 is formed of bendable sheet-metal, and is generally cup-shaped with notches 15 between its wall portions 16. The cap is placed over the head of the bolt spindle and the outer end of the hub 2, and so that the spokes 3 are received in the cap notches 15. The wall portions 16 of the cap are then pinched or otherwise manipulated, so as to close the ends of the notches, when the cap will obviously be connected in a strong manner to the spokes and so that there is no liability of the cap being casually released and displaced. Manifestly when secured over the bolt head and the outer end of the hub and to the spokes in the manner described, the cap 14 will exclude dust and at the same time will prevent the application of a screw driver to disconnect the bolt 11 from the axle 8. When, however, said cap 14 is removed, the said operation may be followed by the ready disconnection of the bolt spindle from the axle for the disconnection of the wheel from the axle.

It will be appreciated from the foregoing that under normal working conditions the bolt 11 will constitute a strong spindle for the wheel, and that the wheel will be free to turn between the bolt head and the outer end of the axle.

The spokes 3 may be riveted, welded or otherwise fixed to the rim 1, without affecting my invention.

Having described my invention, what I claim and desire to secure by Letters Patent, is:

1. A hub cap having notches in its edge to receive wheel spokes and also having wall portions to close the mouths of the notches and thereby connect the cap of itself to spokes.

2. The combination with a wheel with hub and spokes, and a cap having notches receiving wheel spokes and also having wall portions closing the mouths of the said notches, whereby the cap is connected of itself to the spokes of the wheel.

In testimony whereof I affix my signature.

THOMAS LEBLANC.